(12) United States Patent
Hasegawa (10) Patent No.: US 9,917,968 B2
(45) Date of Patent: Mar. 13, 2018

(54) IMAGE PROCESSING DEVICE AND TERMINAL DEVICE USING APPLICATION PROGRAMMING INTERFACE CORRESPONDING TO SPECIFIC FUNCTION

(71) Applicant: Brother Kogyo Kabushiki Kaisha, Nagoya-shi, Aichi-ken (JP)

(72) Inventor: Wataru Hasegawa, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/080,702

(22) Filed: Mar. 25, 2016

(65) Prior Publication Data

US 2017/0078511 A1    Mar. 16, 2017

(30) Foreign Application Priority Data

Sep. 11, 2015   (JP) ................. 2015-179210

(51) Int. Cl.
*H04N 1/00* (2006.01)
*G06F 3/12* (2006.01)

(52) U.S. Cl.
CPC ....... *H04N 1/00954* (2013.01); *G06F 3/1203* (2013.01); *G06F 3/1211* (2013.01); *H04N 1/0097* (2013.01); *H04N 1/00204* (2013.01); *H04N 1/00411* (2013.01); *H04N 2201/0081* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| 8,732,364 | B1* | 5/2014 | LeCrone | G06F 3/0605 710/15 |
| 2008/0037902 | A1* | 2/2008 | Matsumoto | G06T 3/40 382/299 |
| 2012/0137314 | A1 | 5/2012 | Gribel | |
| 2014/0297809 | A1* | 10/2014 | Kim | G06F 17/30964 709/219 |

FOREIGN PATENT DOCUMENTS

| JP | 2011-175358 A | 9/2011 |
| JP | 2012-529681 A | 11/2012 |

* cited by examiner

*Primary Examiner* — Marivelisse Santiago Cordero
*Assistant Examiner* — Lennin Rodriguezgonzalez
(74) *Attorney, Agent, or Firm* — Banner & Witcoff, Ltd.

(57) ABSTRACT

An image processing device acquires a selection instruction to select one of a plurality of functions; and determines whether an operation mode is in a simulation mode in which a specific function is executed according to an instruction from a terminal device, which stores a virtual application program and a virtual service program used for the virtual application program. The device executing, in a case of determining that the operation mode is not the simulation mode, a first function executing process to execute the selected function by: activating the application program corresponding to the selected function, and executing, in a case of determining that the operation mode is the simulation mode, a second function executing process to execute the specific function by: inhibiting activation of the application program; publishing an API corresponding to the specific function; and acquiring an instruction for executing the specific function from the virtual application program.

7 Claims, 7 Drawing Sheets

IMAGE PROCESSING DEVICE AND TERMINAL DEVICE USING APPLICATION PROGRAMMING INTERFACE CORRESPONDING TO SPECIFIC FUNCTION

CROSS-REFERENCE TO RELATED APPLICATION

This application claims priority from Japanese Patent Application No. 2015-179210 filed on Sep. 11, 2015, the entire subject matter of which is incorporated herein by reference.

TECHNICAL FIELD

Techniques disclosed in this specification relate to an image processing device.

BACKGROUND

An image processing device provided with plural pieces of hardware including at least one of an image forming unit and an image reading unit is known. Plural service programs for controlling the plural pieces of hardware and plural application programs for realizing plural different functions such as a copying function and a printing function by operating the hardware via the service programs are stored in a storage unit of the image processing device.

In general, development of an application program for the image processing device is often carried out in a terminal device such as a personal computer, not in the image processing device. However, the terminal device does not include hardware such as the image forming unit or the image reading unit. Accordingly, even when the developed application program is executed in the terminal device, it is not possible to confirm whether the hardware operates normally. In the related art, the application program developed in the terminal device is incorporated into the image processing device to cause the image processing device to execute the application program, so that it was checked whether the hardware operates normally.

SUMMARY

The operation of incorporating an application program developed in a terminal device into an image processing device is troublesome and serves as a cause of a decrease in work efficiency of development of an application program. This problem is not limited to development of an application program, but is common to maintenance of the developed application program.

This specification discloses a technique capable of solving at least the above-mentioned problem.

The technique disclosed in this specification can be embodied, for example, as the following embodiments.

An image processing device of this disclosure includes: a plurality of pieces of hardware, which includes at least one of an image forming unit and an image reading unit; a processor; and a memory storing: a plurality of service programs to control the plurality of pieces of hardware and a plurality of application programs to realize a plurality of functions by operating the hardware via the service program, the plurality of functions differing from each other; and computer readable instruction, when executed by the processor, causing the image processing device to perform: acquiring a selection instruction to select one function of the plurality of functions; determining whether an operation mode is a simulation mode in which a specific function is executed in accordance with an execution instruction from a terminal device, the terminal device storing a virtual application program and a virtual service program, the virtual application program being correlated with the specific function among the plurality of functions, and the virtual service program being used for the virtual application program, executing, when it is determined that the operation mode is not the simulation mode, a first function executing process to execute the selected function by: activating the application program corresponding to the function selected by the acquired selection instruction; and causing the activated application program to operate the hardware via the service program, and executing, when it is determined that the operation mode is the simulation mode, a second function executing process to execute the specific function by: inhibiting the activating of the application program in response to acquisition of the selection instruction to select the specific function; publishing an Application Programming Interface (API) corresponding to the specific function; acquiring an execution instruction of the specific function, which is issued from the virtual application program of the terminal device via the virtual service program, via the API; and operating the hardware in accordance with the acquired execution instruction.

According to the image processing device, when development of an application program (virtual application program) for an image processing device is carried out in the terminal device, it is possible to check whether the hardware such as the image forming unit or the image reading unit of the image processing device normally operates by executing the application program in the terminal device without incorporating the application program into the image processing device. Accordingly, it is possible to improve work efficiency of development of an application program for an image processing device.

The technique disclosed in this specification can be embodied as various embodiments. For example, the technique can be embodied as an image processing device, a terminal device, an image processing system including the image processing device and the terminal device, a control method of the device or the system, a computer program for realizing the control method, a non-transitory recording medium having the computer program recorded thereon, and the like.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

A. Embodiment

A-1. Configuration of Image Processing System 10

Figure 1:
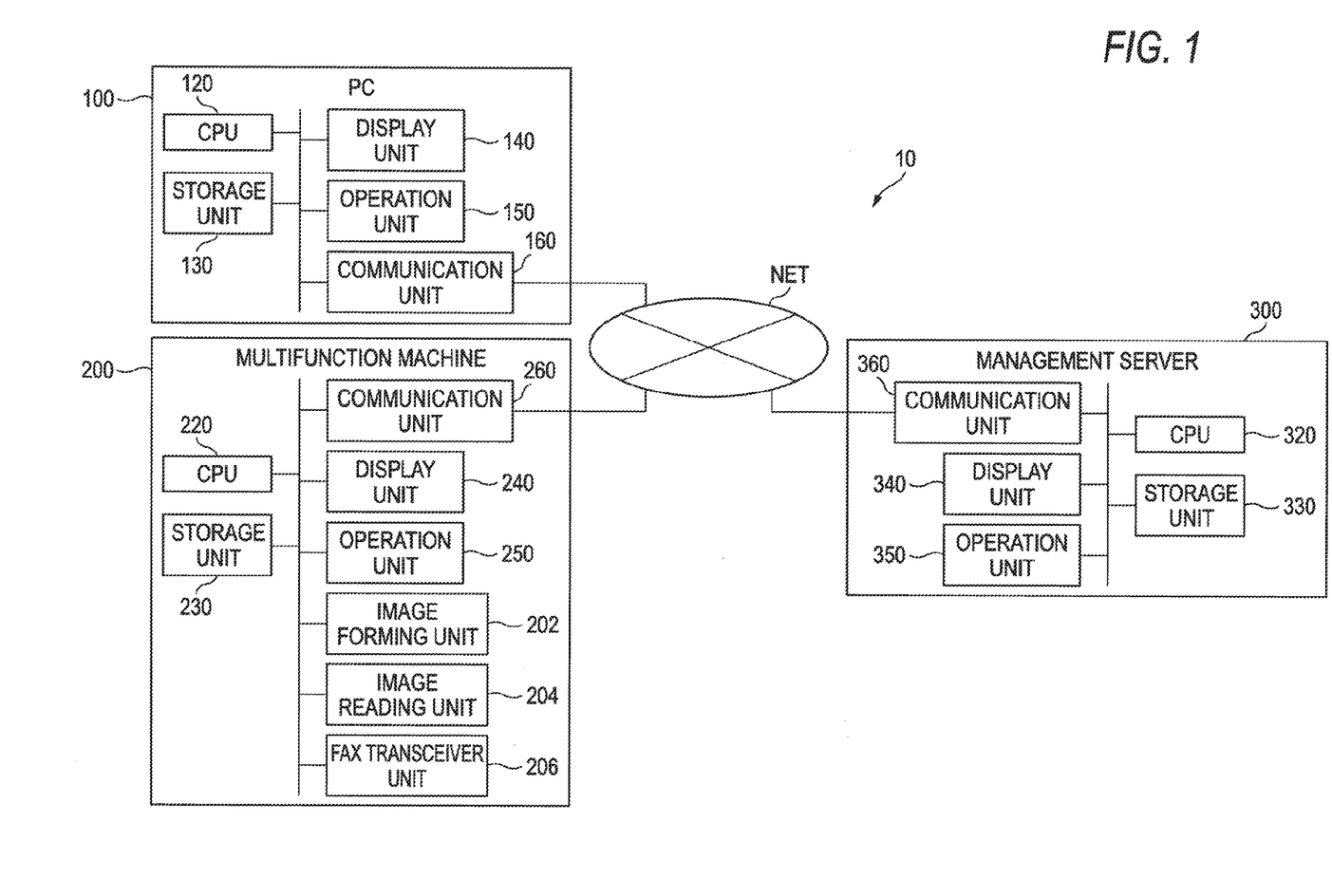
FIG. 1 is a diagram illustrating a configuration of an image processing system according to an embodiment.

FIG. 1 is a diagram illustrating a configuration of an image processing system 10 according to an embodiment. The image processing system 10 includes a personal computer (hereinafter, referred to as "PC") 100, a multifunction machine 200, and a management server 300. The PC 100, the multifunction machine 200, and the management server 300 are connected to communicate with each other via a network NET such as a wired LAN or a wireless LAN.

The multifunction machine 200 is a machine having plural functions such as a scanning function, a printing function, and a copying function and is an example of an image processing device. The multifunction machine 200 includes a CPU 220, a storage unit 230, a display unit 240, an operation unit 250, a communication unit 260, an image forming unit 202, an image reading unit 204, and a FAX transceiver unit 206.

The image forming unit 202 of the multifunction machine 200 is hardware that forms an image on a sheet such as a paper sheet, for example, using an electrophotographic system or an ink jet system. The image reading unit 204 is hardware that includes an image sensor and that reads a document to generate image data indicating an image of the document. The FAX transceiver unit 206 is hardware that includes a modem to perform a process for transmitting and receiving FAX. The display unit 240 includes, for example, a liquid crystal display and displays various setting screens, operating states of the machine, and the like. The operation unit 250 includes, for example, various buttons or switches and receives various input instructions from a user. The operation unit 250 may include a touch panel installed in the display unit 240. In this embodiment, the operation unit 250 can acquire a selection instruction to select one function of among plural functions (such as a scan function, a print function, and a copy function) of the multifunction machine 200. The communication unit 260 is an interface that communicates with another device and includes, for example, a wired LAN interface, a wireless LAN interface, or a USB interface.

The storage unit 230 of the multifunction machine 200 includes a ROM, a RAM, or the like and may store various data or programs or may be used as a work area or a temporary storage area of data in executing various programs. The storage unit is an example of a memory. The CPU 220 controls the units of the multifunction machine 200 by executing a program read from the storage unit 230. For example, the CPU 220 causes the image forming unit 202 to form an image or causes the image reading unit 204 to read an image by controlling the operations of the image forming unit 202 or the image reading unit 204 in accordance with the program read from the storage unit 230. The CPU 220 of the multifunction machine 200 is an example of the processor of the image processing device.

The PC 100 is a terminal device that is used to develop an application program for the multifunction machine 200. The PC 100 includes a CPU 120, a storage unit 130, a display unit 140, an operation unit 150, and a communication unit 160.

The display unit 140 of the PC 100 includes, for example, a liquid crystal display. The operation unit 150 includes, for example, a keyboard, a mouse, or a touch panel. The communication unit 160 is an interface that communicates with another device and includes, for example, a wired LAN interface, a wireless LAN interface, or a USB interface.

The storage unit 130 of the PC 100 includes a ROM, a RAM, a hard disk drive (HDD), and the like and may store various data or programs or may be used as a work area or a temporary storage area of data in executing various programs. The programs stored in the storage unit 130 include a simulation program which is executed in this embodiment. The CPU 120 executes a program read from the storage unit 130 and controls the units of the PC 100 or an external device such as the multifunction machine 200. The CPU 120 of the PC 100 is an example of the processor of the terminal device.

The management server 300 is a server device that is used to manage the PC 100 or the multifunction machine 200. The management server 300 includes a CPU 320, a storage unit 330, a display unit 340, an operation unit 350, and a communication unit 360.

The display unit 340 of the management server 300 includes, for example, a liquid crystal display. The operation unit 350 includes, for example, a keyboard, a mouse, or a touch panel. The communication unit 360 is an interface that communicates with another device and includes, for example, a wired LAN interface, a wireless LAN interface, or a USB interface.

The storage unit 330 of the management server 300 includes a ROM, a RAM, a hard disk drive (HDD), and the like and may store various data or programs or may be used as a work area or a temporary storage area of data in executing various programs. The CPU 320 controls the units of the management server 300 by executing a program read from the storage unit 330.

Figure 2:
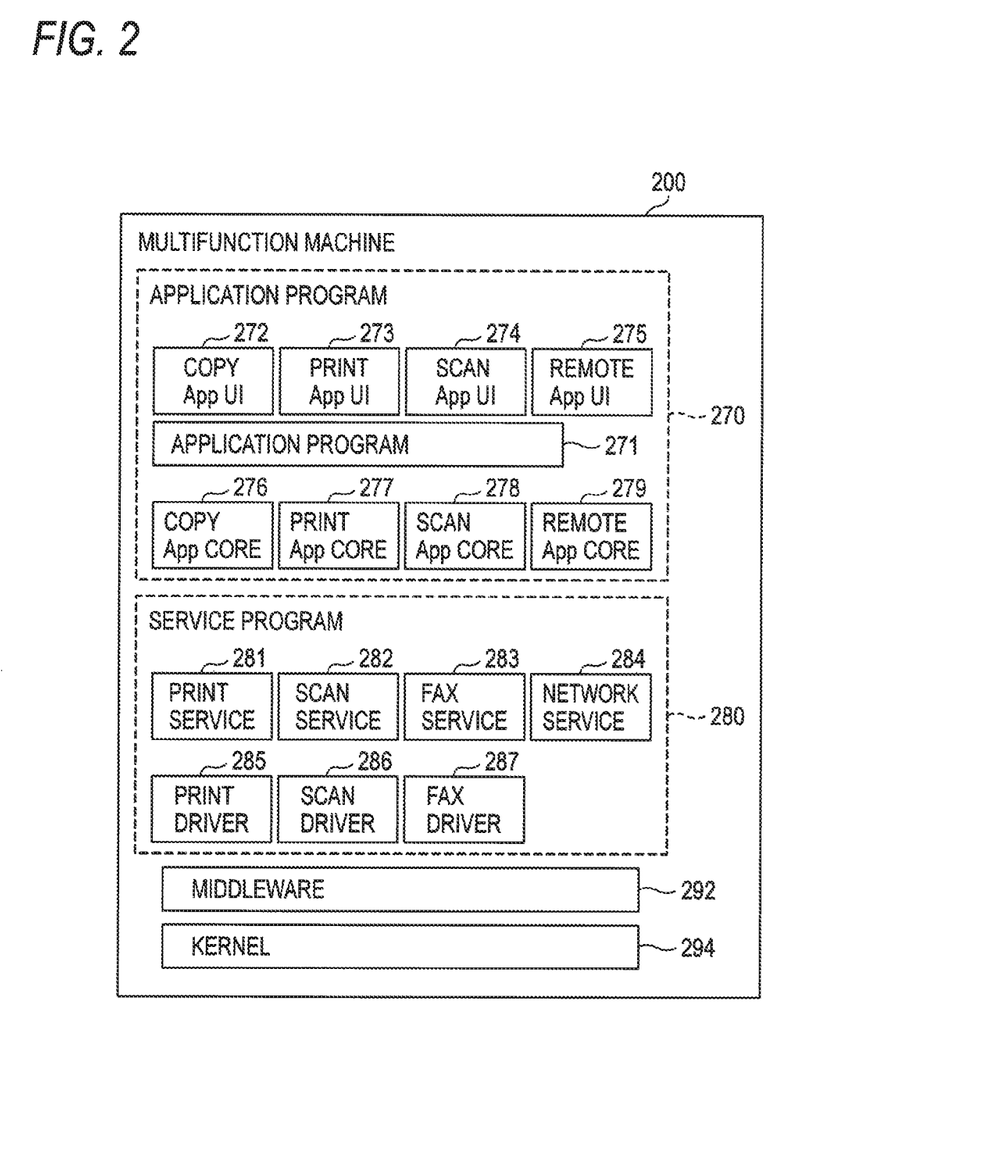
FIG. 2 is a diagram illustrating various programs installed in a multifunction machine.

Various programs are installed in the multifunction machine 200. For example, as illustrated in FIG. 2, various application programs (hereinafter, also referred to as "applications") 270, various service programs (hereinafter, also referred to as "services") 280, middleware 292, and a kernel 294 are installed in the multifunction machine 200. A state where a program is installed in a device means a state where various files constituting the program are stored in the storage unit of the device and the program can be executed by the device. FIG. 2 schematically illustrates a state in which various programs are installed in the multifunction machine 200. The same is true in the subsequent drawings thereto.

The kernel 294 is a basic component of an operating system and is software that exchanges a command or information between the hardware such as the image forming unit 202 or the image reading unit 204 and the applications 270 or the services 280. The middleware 292 is software that exchanges a command or information between the operating system including the kernel 294 and the applications 270 or the services 280.

The services 280 are software that controls the hardware such as the image forming unit 202 or the image reading unit 204 via the middleware 292 or the kernel 294. In this embodiment, the services 280 includes a combination of a driver layer controlling the hardware and a service layer exchanging a command or information between the driver layer and the applications 270, for each piece of hardware. Specifically, the services 280 includes a print driver 285 and a print service 281 for controlling the image forming unit 202, a scan driver 286 and a scan service 282 for controlling the image reading unit 204, and a FAX driver 287 and a FAX service 283 for controlling the FAX transceiver unit 206. The services 280 include a network service 284 for controlling the communication unit 260.

The applications 270 are software that realizes various functions of the multifunction machine 200 by operating various pieces of hardware via the services 280. In this embodiment, the applications 270 include a combination of an application UI (App UI) providing a UI and an application core (App Core) executing a function for each function. Specifically, the applications 270 include: a copy application UI (hereinafter, also referred to as "copy UI") 272 and a copy application core (hereinafter, also referred to as "copy core") 276 relevant to a copy function using the image reading unit 204 and the image forming unit 202; a print application UI (hereinafter, also referred to as "print UI") 273 and a print application core (hereinafter, also referred to as "print core") 277 relevant to a print function using the image forming unit 202; and a scan application UI (hereinafter, also referred to as "scan UI") 274 and a scan application core (hereinafter, also referred to as "scan core") 278 relevant to a scan function using the image reading unit 204. The applications 270 include a remote application UI (hereinafter, also referred to as "remote UI") 275 and a remote application core (hereinafter, also referred to as "remote core") 279 for realizing an operation in an external access mode to be described later. The applications 270 include an application manager 271 controlling start or end of each program.

The PC 100 (FIG. 1) serves as a simulator of the multifunction machine 200 by executing a simulation program in the external access mode to be described later. When the PC 100 serves as the simulator of the multifunction machine 200, it is possible to operate various pieces of hardware of the multifunction machine 200 by causing the PC 100 to execute various application programs for the multifunction machine 200.

Figure 3:
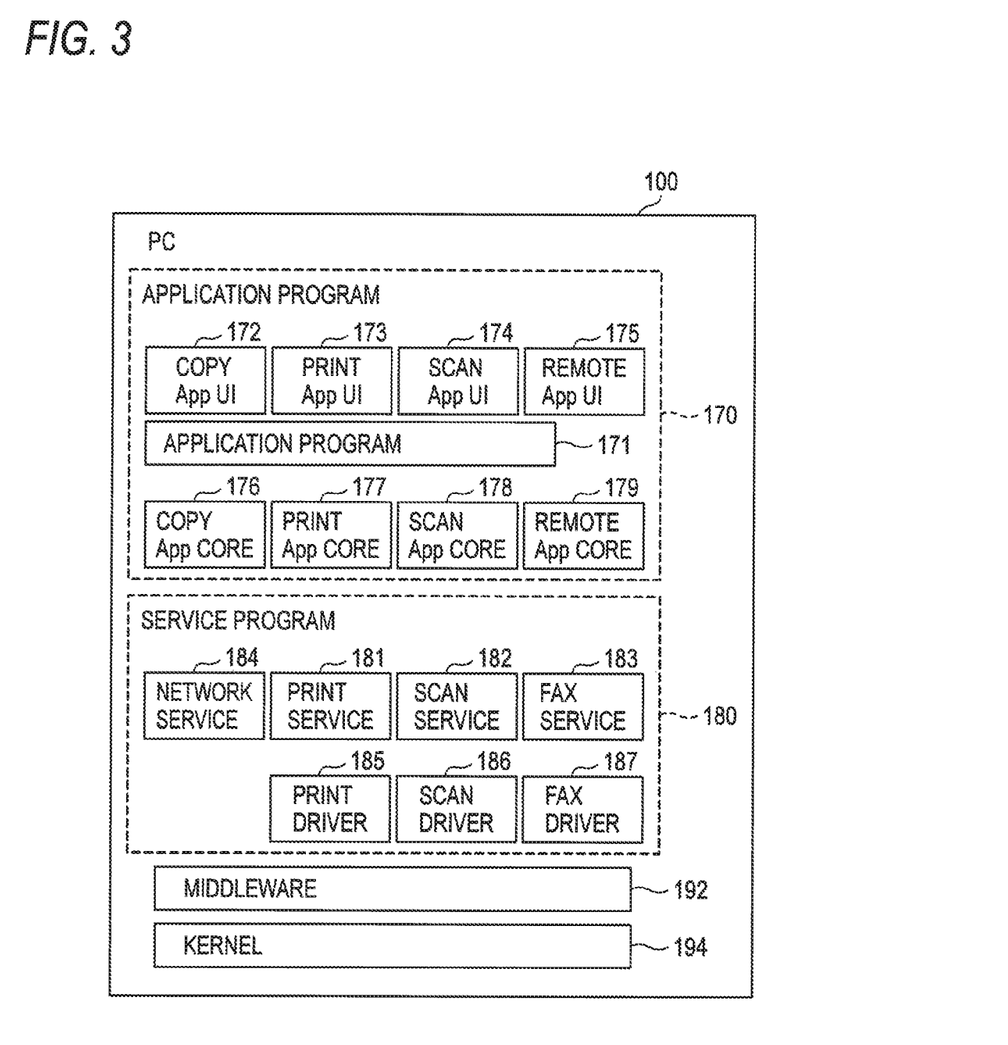
FIG. 3 is a diagram illustrating various programs installed in a PC.

In order to cause the PC 100 to serve as the simulator of the multifunction machine 200, the same programs as installed in the multifunction machine 200 are installed in the PC 100 as illustrated in FIG. 3. Specifically, applications 170, services 180, middleware 192, and a kernel 194 are installed in the PC 100. The applications 170 include an application manager 171, a copy UI 172 and a copy core 176, a print UI 173 and a print core 177, a scan UI 174 and a scan core 178, and a remote UI 175 and a remote core 179. The services 180 include a print driver 185 and a print service 181, a scan driver 186 and a scan service 182, a FAX driver 187 and a FAX service 183, and a network service 184. Among the programs installed in the PC 100, the print driver 185, the scan driver 186, and the FAX driver 187 included in the services 180 are stubs which are developed for simulation. The other programs are programs which are developed to be mounted on the multifunction machine 200 and are the same programs or the same types of programs having different versions as the programs having like names installed in the multifunction machine 200. A part or all of the applications 170 are an example of the virtual application program, and a part or all of the services 180 are an example of the virtual service program.

A-2. Simulation Process

A simulation process which is performed by the image processing system 10 will be described below. The simulation process is a process of operating various pieces of hardware of the multifunction machine 200 by causing the PC 100 to execute the applications 170 for the multifunction machine 200. By this simulation process, it is possible to verify whether various pieces of hardware of the multifunction machine 200 can be normally operated by the applications 170, that is, whether the applications 170 have a problem, without incorporating the applications 170 for the multifunction machine 200 developed in the PC 100 into the multifunction machine 200. The simulation process includes an initial process and a simulation executing process.

A-2-1. Initial Process

Figure 4A:
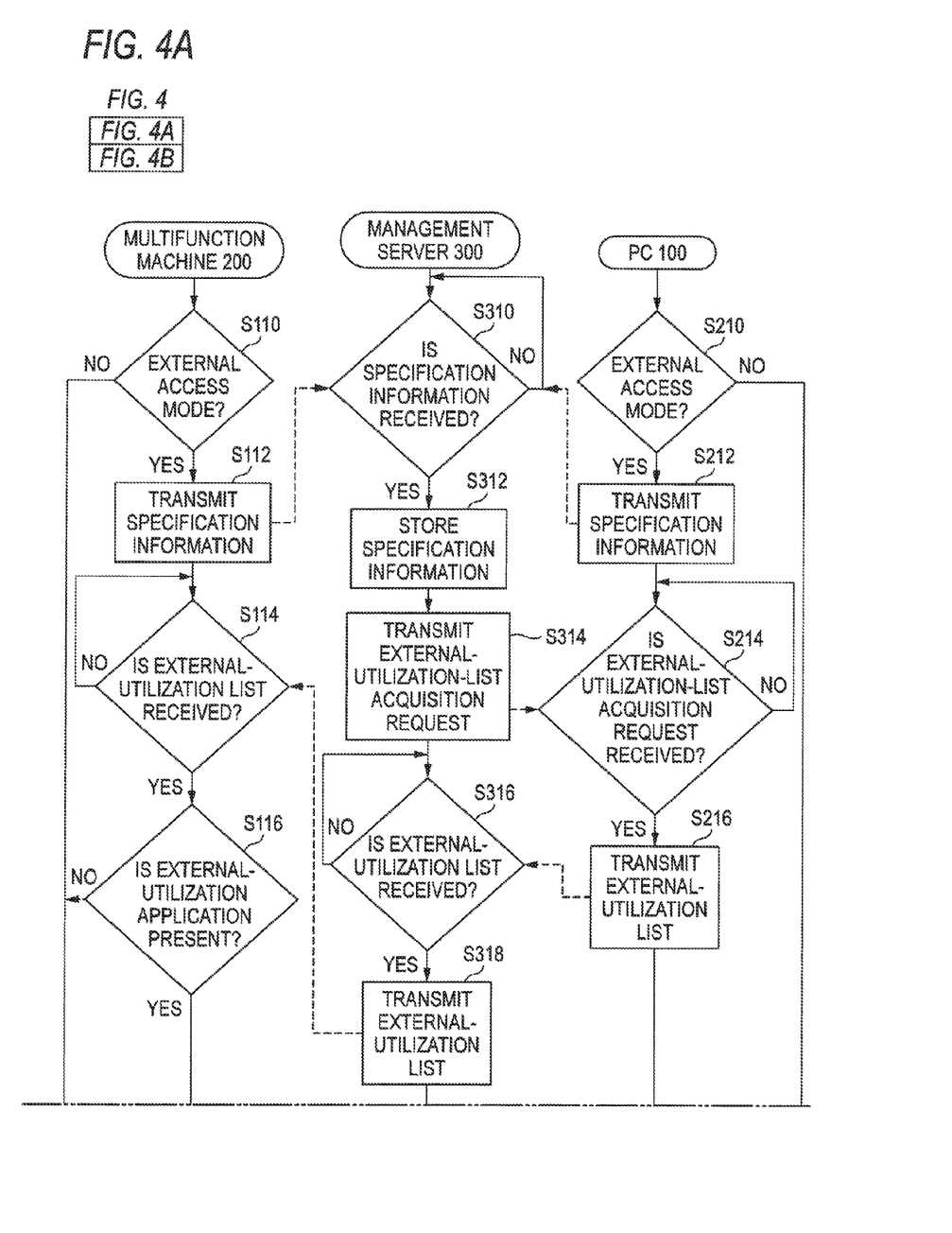
FIGS. 4A and 4B are a flowchart illustrating an initial process.

The initial process of the simulation process is a process of preparing for causing the PC 100 to function as the simulator of the multifunction machine 200. As illustrated in FIG. 4A, the CPU 220 of the multifunction machine 200 determines whether it is activated in the external access mode at the time of start thereof (S110). For example, when the CPU 220 determines that it is activated in the external access mode when a specific button or switch of the operation unit 250 is in a specific state at the time of activation, and determines that it is activated in a normal mode other than the external access mode otherwise. The external access mode is a mode in which one or more specific functions (hereinafter, referred to as "external-utilization functions") which will be simulated by the PC 100 can be executed in accordance with an execution instruction from the PC 100 and is an example of the simulation mode.

When it is determined that it is activated in the normal mode (NO in step S110), the CPU 220 of the multifunction machine 200 ends the initial process. In the normal mode, when a selection instruction to select one of plural functions is acquired via the operation unit 250, the CPU 220 executes the selected function by activating the applications 270 corresponding to the function selected by the acquired selection instruction and causing the activated applications 270 to operate the hardware via the services 280.

On the other hand, when it is determined that it is activated in the external access mode (YES in S110), the CPU 220 of the multifunction machine 200 transmits specification information to the management server 300 (S112). The specification information includes, for example, information for specifying the model number of multifunction machine 200 or information for specifying the versions of various programs.

Similarly, the CPU 120 of the PC 100 determines whether an operation mode is the external access mode (S210). When a simulation program is activated and a function to be simulated is designated by a user of the PC 100, the CPU 120 of the PC 100 determines that the operation mode is the external access mode. When it is determined that the operation mode is not the external access mode (NO in S210), the CPU 120 ends the initial process and performs a normal execution process relevant to the activated program. On the other hand, when it is determined that the operation mode is the external access mode (YES in S210), the CPU 120 transmits the specification information to the management server 300 (S212). The specification information includes, for example, information for specifying the model number of multifunction machine 200 or information for specifying the versions of various programs to be simulated. For example, the specification information is set in the simulation program stored in the PC 100.

The CPU 320 of the management server 300 waits for reception of the specification information transmitted from the multifunction machine 200 or the PC 100 (S310) and then stores the received specification information in the storage unit 330 (S312) when the specification information is received (YES in S310).

Figure 4B:
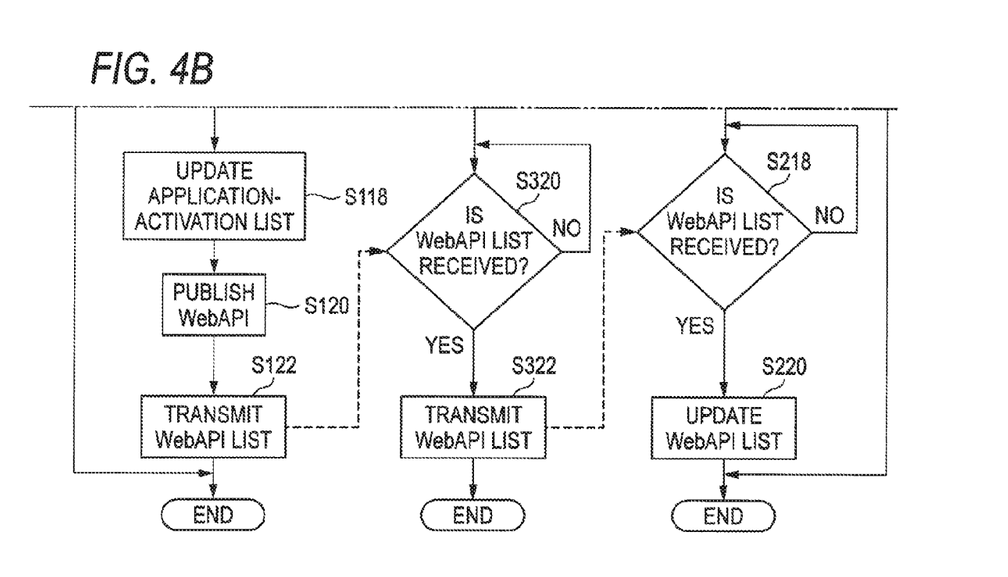

Then, the CPU 320 of the management server 300 transmits an external-utilization-list acquisition request to the PC 100 (S314). The CPU 120 of the PC 100 waits for reception of the external-utilization-list acquisition request transmitted from the management server 300 (S214), and prepares and transmits an external-utilization list to the management server 300 (S216) when the external-utilization-list acquisition request is received (YES in S214). The external-utilization list is information for specifying functions (externally use) to be simulated by the PC 100 among the functions of the multifunction machine 200. The external-utilization list is information on the functions to be simulated which are designated by the user. When the copy function is simulated by the PC 100, the copy function is specified as the external-utilization function in the external-utilization list, for example. A correlation table in which the functions to be simulated and information of the services required for realizing the functions are correlated with each other may be stored in the PC 100. The PC 100 may specify the service corresponding to the external-utilization function designated by the user in the external usable list from the correlation table and may transmit information on the specified service as an external-utilization list to the management server 300. For example, when the copy function is simulated by the PC 100, the copy function may be specified as the external-utilization function in the external-utilization list, and the print service and the scan service may be specified as a service for realizing the copy function.

The CPU 320 of the management server 300 waits for reception of the external-utilization list transmitted from the PC 100 (S316) and then transmits the external-utilization list to the multifunction machine 200 (S318) when the external-utilization list is received (YES in S316). The CPU 220 of the multifunction machine 200 waits for reception of the external-utilization list transmitted from the management server 300 (S114), and specifies an external-utilization function with reference to the external-utilization list and determines whether an external-utilization application which is the application 270 for realizing the specified external-utilization function is installed in the multifunction machine 200 (S116) when the external-utilization list is received (YES in S114). For example, when the external-utilization list in which the copy function is specified as the external-utilization function is acquired, the CPU 220 determines whether the copy UI 272 or the copy core 276 is installed in the multifunction machine 200. When it is determined that the external-utilization application is not installed (NO in S116), the CPU 220 of the multifunction machine 200 moves to the normal mode and ends the initial process. At this time, the CPU 220 of the multifunction machine 200 may notify the PC 100 via the management server 300 that the external-utilization application is not installed. Accordingly, the PC 100 can grasp that the external-utilization function cannot be executed by the multifunction machine 200.

On the other hand, when it is determined that the external-utilization application is installed (YES in S116), the CPU 220 of the multifunction machine 200 updates an application-activation list (S118). The application-activation list is a list for specifying the applications 270 to be activated in the multifunction machine 200 when a selection instruction to select one of the plural functions is acquired is referred to by the application manager 271. In the initial state, the functions (for example, the copy function) and the applications 270 (for example, the copy UI 272 and the copy core 276) for executing the functions are correlated in the application-activation list. The CPU 220 of the multifunction machine 200 updates the application-activation list so as to correlate the external-utilization function specified by the external-utilization list with the remote UI 275 and the remote core 279 which are applications 270 for external use. Accordingly, activating of the applications 270 for executing the external-utilization function is inhibited by acquisition of the selection instruction to select the external-utilization function. For example, when the external-utilization function is the copy function and the selection instruction to select the copy function is acquired, the remote UI 275 and the remote core 279 are activated instead of the copy UI 272 and the copy core 276.

The CPU 220 of the multifunction machine 200 publishes a WebAPI corresponding to the external-utilization function (S120) and transmits a WebAPI list to the management server 300 (S122). At this time, the WebAPIs for the functions other than the external-utilization function are not published. For example, when the external-utilization function is the copy function, the CPU 220 publishes the WebAPI corresponding to the copy function and does not publish the WebAPIs corresponding to the other functions (such as the scan function).

The CPU 320 of the management server 300 waits for reception of the WebAPI list transmitted from the multifunction machine 200 (S320) and then transmits the WebAPI list to the PC 100 (S322) when the WebAPI list is received (YES in S320). The CPU 120 of the PC 100 waits for reception of the WebAPI list transmitted from the management server 300 (S218) and then updates the WebAPI list stored in the storage unit 130 (S220) when the WebAPI list is received (YES in S218). Accordingly, the PC 100 can use the WebAPI relevant to the external-utilization function which is published in the multifunction machine 200.

A-2-2. Simulation Executing Process

The simulation executing process will be described below. The simulation executing process is a process of operating various pieces of hardware of the multifunction machine 200 operating in the external access mode by causing the PC 100 operating in the external access mode to operate the applications 170 for the multifunction machine 200. Here, the execution of the simulation executing process in a case where the external-utilization function is the copy function, that is, where the PC 100 operates the image forming unit 202 or the image reading unit 204 of the multifunction machine 200 by executing the applications 170 (the copy UI 172 and the copy core 176) relevant to the copy function, will be described below. In the following description, "a CPU performs a process Y by executing a program X" is also referred to as "a program X performs a process Y", for descriptive purposes.

Figure 5:
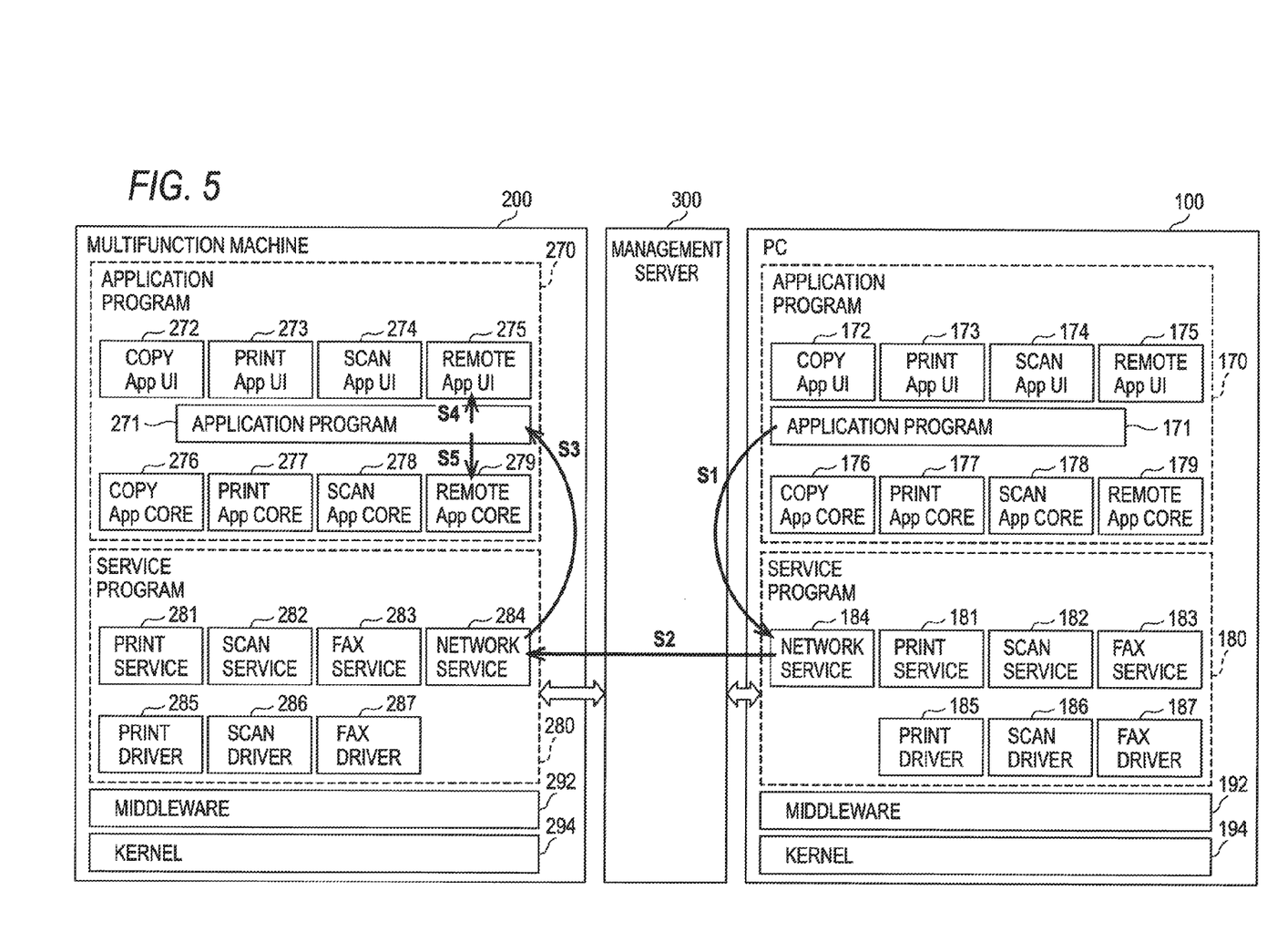
FIG. 5 is a diagram illustrating a simulation executing process.

Although it is not illustrated, the applications 170 in the PC 100 include an application UI for displaying the same virtual standby screen as the standby screen of the multifunction machine 200. In the virtual standby screen, a function to be executed among plural functions can be selected by a user. When the selection instruction to select the copy function as the external-utilization function among the plural functions displayed on the virtual standby screen is acquired in the PC 100 as the simulator of the multifunction machine 200, as illustrated in FIG. 5, the selection instruction to select the copy function is transmitted from the application manager 171 of the PC 100 to the network service 184 (51) and is transmitted to the network service 284 of the multifunction machine 200 via the management server 300 (S2). When the network service 284 of the PC 100 transmits the received selection instruction to select the copy function to the application manager 271 (S3), the application manager 271 sends the execution instruction to the remote UI 275 and the remote core 279, not to the copy UI 272 and the copy core 276, based on the application-activation list updated in S118 of FIG. 4B (S4 and S5).

When the execution instruction is received from the application manager 271, the remote UI 275 switches the display screen of the display unit 240 of the multifunction machine 200 from the standby screen to the display screen indicating that simulation is being executed.

Figure 6:
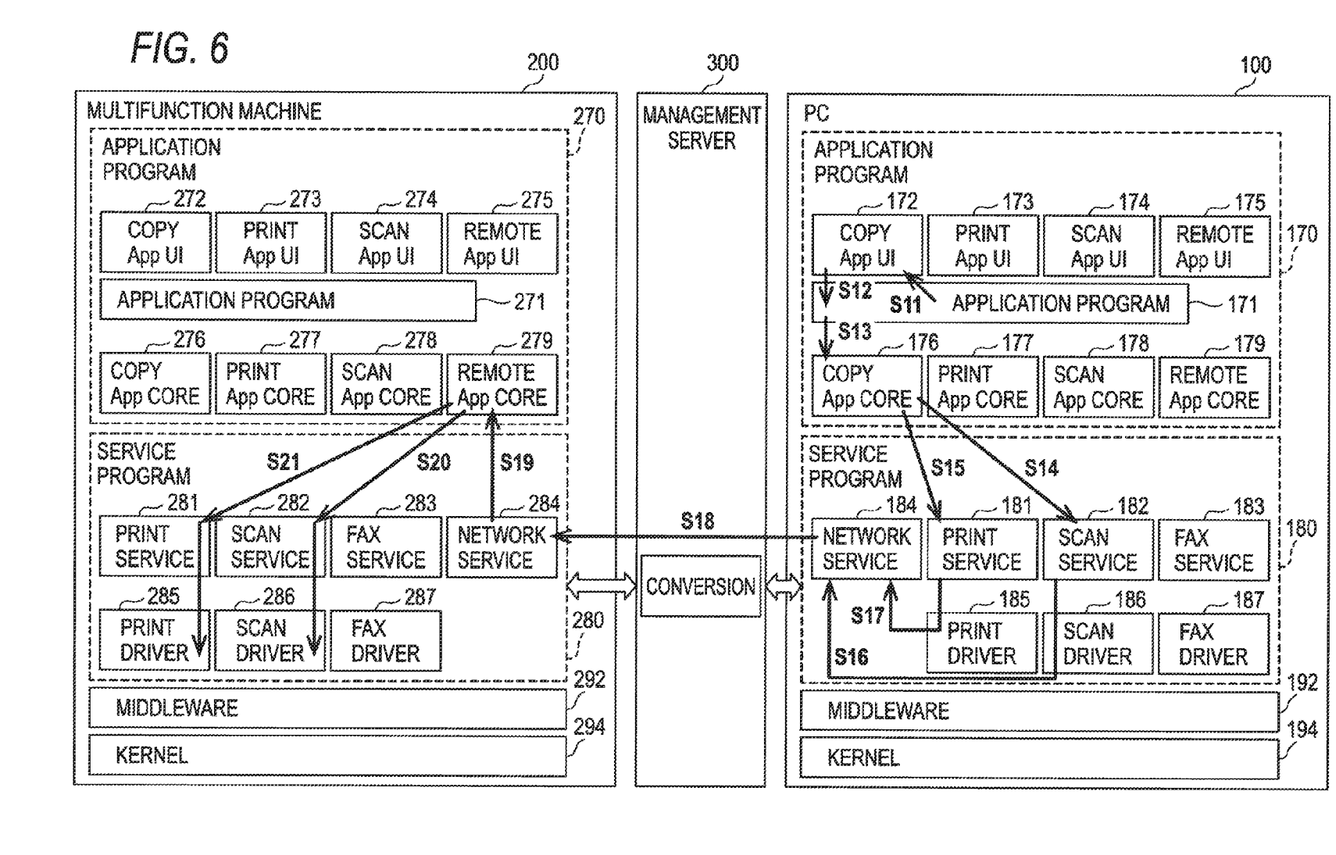
FIG. 6 is a diagram illustrating a simulation executing process.

As illustrated in FIG. 6, the application manager 171 of the PC 100 activates the copy UI 172 (S11). Accordingly, the user can input setting items required for executing the copy function or instruct to execute the copy function using the operation unit 150 of the PC 100. When the execution instruction to execute the copy function is acquired by the copy UI 172, the copy core 176 is activated by the application manager 171 (S12 and S13), and the copy core 176 sends a copy execution command to the print service 181 and the scan service 182 which are used to execute the copy function (S14 and S15).

In the PC 100, the WebAPI list is updated in step S220 of FIG. 4B, and the WebAPI corresponding to the external-utilization function can be used. The print service 181 and the scan service 182 issue a utilization request (HTTP request) of the WebAPI corresponding to the copy function via the print driver 185 and the scan driver 186 (S16 and S17). Accordingly, the WebAPI utilization request is transmitted to the network service 284 of the multifunction machine 200 via the management server 300 by the network service 184 (S18).

As described above, the management server 300 acquires and stores the specification information of the PC 100 and the multifunction machine 200 (S312 in FIG. 4A). The management server 300 has a function of converting the WebAPI utilization request based on a difference in specification (the model number or the program version) between the PC 100 and the multifunction machine 200 at the time of relay of the WebAPI utilization request. A WebAPI response (HTTP response) which is transmitted from the multifunction machine 200 to the PC 100 in response to the WebAPI utilization request is similarly converted by the management server 300 if necessary. Even when a difference in specification is present between the PC 100 and the multifunction machine 200, the PC 100 can be made to function as the simulator of the multifunction machine 200 by the conversion function of the management server 300.

The network service 284 of the multifunction machine 200 receiving the WebAPI utilization request corresponding to the copy function sends a copy execution instruction to the remote core 279 for external use (S19). The remote core 279 operates the image reading unit 204 via the scan service 282 and the scan driver 286 and operates the image forming unit 202 via the print service 281 and the print driver 285 (S20 and S21). Accordingly, in the multifunction machine 200, the copy function is executed by the image reading unit 204 and the image forming unit 202. Information on the process result or the like is transmitted as a WebAPI response (HTTP response) from the network service 284 of the multifunction machine 200 to the network service 184 of the PC 100. Accordingly, the PC 100 can check whether each of hardware of the multifunction machine 200 normally operates by causing the PC 100 to execute the applications 170.

As described above, in the image processing system 10 according to this embodiment, the CPU 220 of the multifunction machine 200 performs the determination process of determining whether the operation mode is the external access mode in which a specific function (external-utilization function) is executed in accordance with the execution instruction from the PC 100. When it is determined that the operation mode is not the external access mode but the normal mode, the CPU 220 of the multifunction machine 200 performs a process (hereinafter, referred to as a "first function executing process") of executing the selected function by activating the applications 270 corresponding to the function selected by the selection instruction to select one of the plural functions via the operation unit 250 and causing the activated applications 270 to operate the hardware via the services 280. Therefore, in the normal mode, it is possible to execute the selected function by causing the multifunction machine 200 to execute the applications 270. On the other hand, when it is determined that the operation mode is the external access mode, the CPU 220 of the multifunction machine 200 inhibits the applications 270 for executing the external-utilization function from being activated in response to acquisition of the selection instruction to select the external-utilization function. The CPU 220 of the multifunction machine 200 performs a process (hereinafter, referred to as a "second function executing process") of executing the external-utilization function by publishing the WebAPI corresponding to the external-utilization function, acquiring the execution instruction to execute the external-utilization function, which is issued from the applications 170 of the PC 100 via the services 180, via the WebAPI, and operating the hardware in accordance with the acquired execution instruction. Accordingly, when an application 170 (virtual application program) for the multifunction machine 200 is developed in the PC 100, it is possible to check whether the hardware such as the image forming unit 202 or the image reading unit 204 of the multifunction machine 200 operates normally by causing the PC 100 to execute the application 170 without incorporating the application 170 to the multifunction machine 200. Accordingly, it is possible to improve work efficiency in development of an application program for the multifunction machine 200.

In the image processing system 10 according to this embodiment, the remote UI 275 and the remote core 279 for realizing the operation in the external access mode are stored in the storage unit 230 of the multifunction machine 200 (that is, the remote UI 275 and the remote core 279 are installed in the multifunction machine 200). In the external access mode, the CPU 220 of the multifunction machine 200 executes the external-utilization function by activating the remote UI 275 and the remote core 279 in accordance with the execution instruction to execute the external-utilization function which is acquired via the WebAPI and causing the activated remote UI 275 and the activated remote core 279 to operate the hardware via the services 280. Accordingly, it is possible to realize the second function executing process without changing the other services 280, for example, the print service 281 or the print driver 285, stored in the storage unit 230 of the multifunction machine 200.

In the image processing system 10 according to this embodiment, the CPU 220 of the multifunction machine 200 performs the determination process at the time of activating of the multifunction machine 200. Accordingly, the multifunction machine 200 is prevented from being switched to the external access mode after it is activated in the normal mode other than the external access mode. As a result, for example, it is possible to suppress occurrence of a state where a usable function is suddenly disabled by switching the operation mode to the external access mode.

In the image processing system 10 according to this embodiment, in the second function executing process, the CPU 220 of the multifunction machine 200 publishes the API corresponding to the external-utilization function among the plural functions of the multifunction machine 200 and does not publish the APIs corresponding to the functions other than the external-utilization function. Accordingly, in the external access mode, the functions other than the external-utilization function can be kept usable to suppress a decrease in convenience.

In the image processing system 10 according to this embodiment, the CPU 220 of the multifunction machine 200 specifies the external-utilization function based on the external usable list acquired from the management server 300 via the communication unit 260 in the second function executing process. Accordingly, the CPU 220 of the multifunction machine 200 can surely specify an external-utilization function.

In the image processing system 10 according to this embodiment, the CPU 220 of the multifunction machine 200 notifies the management server 300 of information for specifying the specification of the multifunction machine 200 via the communication unit 260, and the PC 100 acquires the execution instruction to execute the external-utilization function which is converted by the management server 300 according to the relationship between the specification of the multifunction machine 200 and the specification of the PC 100. Accordingly, even if a difference is present between the specification of the multifunction machine 200 and the specification of the PC 100, it is possible to operate the hardware such as the image forming unit 202 or the image reading unit 204 of the multifunction machine 200 by causing the PC 100 to execute the applications 170.

In the image processing system 10 according to this embodiment, the CPU 120 of the PC 100 acquires a list of APIs published by the multifunction machine 200. The CPU 120 of the PC 100 operates the hardware of the multifunction machine 200 to execute the external-utilization function by activating the application 170 developed for the multifunction machine 200 and causing the activated application 170 to call the API corresponding to the external-utilization function via the service 180. Accordingly, when an application 170 (virtual application program) for the multifunction machine 200 is developed in the PC 100, it is possible to check whether the hardware of the multifunction machine 200 operates normally by causing the PC 100 to execute the application 170 without incorporating the application 170 into the multifunction machine 200 and it is thus possible to improve work efficiency in development of an application program for the multifunction machine 200.

B. Modified Examples

The technique disclosed in this specification is not limited to the above-mentioned embodiment, but can be modified in various forms without departing from the gist thereof. For example, the technique may be modified as follows.

The configuration of the image processing system 10 according to the above-mentioned embodiment is only an example and can be modified in various forms. For example, in the above-mentioned embodiment, the multifunction machine 200 may include plural pieces of hardware including at least one of the image forming unit 202 and the image reading unit 204, may not include at least one of the image forming unit 202, the image reading unit 204, and the FAX transceiver unit 206, or may include other hardware.

The applications 270 or the services 280 installed in the multifunction machine 200 can be changed in various forms according to the functions of the multifunction machine 200. In the above-mentioned embodiment, the services 280 have a two-layer structure of the service layer and the driver layer, but the services 280 may have a single-layer structure or a three-layer or more structure.

In the above-mentioned embodiment, the image processing system 10 includes the management server 300 and the multifunction machine 200 and the PC 100 exchange information therebetween via the management server 300, but the multifunction machine 200 and the PC 100 may exchange information without using the management server 300. For example, when conversion of the execution instruction between the multifunction machine 200 and the PC 100 is not necessary, the multifunction machine 200 and the PC 100 can exchange information to realize the simulation process without using the management server 300.

In the above-mentioned embodiment, a part of the configuration which is embodied by hardware may be replaced with software, or a part of the configuration which is embodied by software may be replaced with hardware.

In the simulation process according to the above-mentioned embodiment, some steps may be skipped, details thereof may be changed, or the order of steps may be changed. In the above-mentioned embodiment, the CPU 220 of the multifunction machine 200 performs the determination process of determining whether it is activated in the external access mode at the time of activating of the multifunction machine 200, but may perform the determination process at a predetermined timing during waiting after the multifunction machine 200 is activated. In this case, since the multifunction machine 200 can be switched to the external access mode to perform the second function executing process without restarting after the multifunction machine 200 is activated in the normal mode other than the external access mode, it is possible to further improve work efficiency of development of an application program for the multifunction machine 200 or the like.

In the above-mentioned embodiment, a case in which an application program for the multifunction machine 200 is developed is exemplified, but the present invention can be similarly applied to a case in which maintenance of an application program is carried out after the application program is developed.

What is claimed is:
1. An image processing device comprising:
hardware including at least one of an image forming unit and an image reading unit;
a communication unit;
a processor; and
a memory storing:
a plurality of service programs to control the hardware;
a plurality of application programs to realize a plurality of functions by operating the hardware via the service programs, the plurality of functions differing from each other; and
computer readable instruction, when executed by the processor, causing the image processing device to perform:
acquiring a selection instruction to select one function of the plurality of functions;
determining whether an operation mode is a simulation mode in which a specific function is executed in accordance with an execution instruction from a terminal device, the terminal device storing a virtual application program and a virtual service program, the virtual application program being correlated with the specific function among the plurality of functions, and the virtual service program being used for the virtual application program, executing, in a case of determining that the operation mode is not the simulation mode, a first function executing process to execute the selected function by:
  activating the application program corresponding to the function selected by the acquired selection instruction; and
  causing the activated application program to operate the hardware via the service program, and
executing, in a case of determining that the operation mode is the simulation mode, a second function executing process to execute the specific function by:
  inhibiting the activating of the application program in response to acquisition of the selection instruction to select the specific function;
  publishing an Application Programming Interface (API) corresponding to the specific function;
  acquiring an execution instruction of the specific function, which is issued from the virtual application program of the terminal device via the virtual service program, via the API; and
  operating the hardware in accordance with the acquired execution instruction,
wherein, in executing the second function executing process, the processor specifies the specific function based on information acquired from a management server via the communication unit,
notifying the management server of information specifying a specification of the image processing device via the communication unit, and
acquiring the execution instruction from the terminal device, which is converted by the management server based on a relationship between the specification of the image processing device and the specification of the terminal device.

2. The image processing device according to claim 1, wherein the memory stores an external application program, and
wherein, in the executing the second function executing process, the image processing device executes the specific function by:
  activating the external application program in accordance with the acquired execution instruction; and
  causing the activated external application program to operate the hardware via the service programs.

3. The image processing device according to claim 1, wherein the image processing device performs the determining when activated.

4. The image processing device according to claim 1, wherein the image processing device performs the determining at a predetermined timing during waiting after being activated.

5. The image processing device according to claim 1, wherein, in the executing the second function executing process, the image processing device publishes an API corresponding to the specific function among the plurality of functions and does not publish other APIs corresponding to the plurality of functions other than the specific function.

6. A terminal device comprising:
a communication unit, the terminal device being able to communicate with a management server via the communication unit;
a processor; and
a memory storing:
  a virtual application program correlated with a specific function among a plurality of functions, which are provided from an image processing device, the plurality of functions differing from each other, the image processing device including a hardware that includes at least one of an image forming unit and an image reading unit and storing a plurality of service programs for controlling the hardware and a plurality of application programs for realizing the plurality of functions by operating the hardware via the service programs;
  a virtual service program used for the virtual application program; and
  computer readable instructions, when executed by the processor, causing the terminal device to perform:
    acquiring a list of application programming interfaces (API) published by the image processing device;
    executing a specific function executing process to operate the hardware to execute the specific function by:
      activating the virtual application program; and
      causing the activated virtual application program to call the API corresponding to the specific function via the virtual service program;
    notifying the management server of information specifying a specification of the terminal device via the communication unit; and
    transmitting an execution instruction to the image processing device, which is converted by the management server based on a relationship between the specification of the image processing device and the specification of the terminal device.

7. A non-transitory computer readable medium storing instructions executable by a computer comprising a communication unit, the computer able to communicate with a management server via the communication unit, a processor and a memory storing: a virtual application program correlated with a specific function among a plurality of functions, which are provided from an image processing device, the plurality of functions differing from each other, the image processing device including hardware that includes at least one of an image forming unit and an image reading unit and storing a plurality of service programs for controlling the hardware and a plurality of application programs for realizing the plurality of functions by operating the hardware via the service programs; a virtual service program used for the virtual application program, the instructions, when executed, cause the computer to perform:
  acquiring a list of application programming interfaces (API) published by the image processing device;
  executing a specific function executing process to operate the hardware to execute the specific function by:
    activating the virtual application program; and
    causing the activated virtual application program to call the API corresponding to the specific function via the virtual service program;
  notifying the management server of information specifying a specification of the computer via the communication unit; and
  transmitting an execution instruction to the image processing device, which is converted by the management server based on a relationship between the specification of the image processing device and the specification of the computer.

\* \* \* \* \*